United States Patent

Ohno et al.

[11] Patent Number: 5,487,425
[45] Date of Patent: Jan. 30, 1996

[54] COMPOSITION AND METHOD FOR RECOVERY OF PETROLEUM AND GAS

[75] Inventors: Takamasa Ohno, Musashino; Keietsu Kato, Chiba; Yoshiyuki Yamaguchi, Tokyo; Masami Murakami, Akishima, all of Japan; Shogo Suzuki, Calgary, Canada; Shoichi Kanda; Tsuyoshi Nakagawa, both of Yokohama, Japan

[73] Assignees: Nitto Chemical Industry Co., Ltd.; Japan Petroleum Exploration Co., Ltd., both of Tokyo, Japan

[21] Appl. No.: 310,486

[22] Filed: Sep. 22, 1994

[30] Foreign Application Priority Data

Sep. 24, 1993 [JP] Japan .................. 5-238173

[51] Int. Cl.$^6$ .................................. C09K 7/02
[52] U.S. Cl. ................ 166/295; 523/130; 524/342; 524/343; 524/346
[58] Field of Search ................ 524/343, 342, 524/346; 166/295; 523/130

[56] References Cited

U.S. PATENT DOCUMENTS

| | | |
|---|---|---|
| 3,762,476 | 10/1973 | Gall . |
| 4,246,124 | 1/1981 | Swanson . |
| 4,644,020 | 3/1987 | Stahl . |
| 4,683,949 | 8/1987 | Sydansk et al. . |
| 4,799,548 | 1/1989 | Mumallah et al. ........ 166/288 |
| 4,799,550 | 1/1989 | Harris et al . |
| 4,845,134 | 7/1989 | Mumallah et al. ........ 524/342 |
| 4,906,701 | 3/1990 | Clark, Jr. . |
| 4,926,943 | 5/1990 | Hoskin . |
| 4,964,463 | 10/1990 | Shu . |

*Primary Examiner*—Jeffrey T. Smith
*Attorney, Agent, or Firm*—Cushman Darby & Cushman

[57] ABSTRACT

The present invention provides a composition for recovery of petroleum and gas, which comprises (a) a copolymer having a molecular weight of 100,000 or more, composed of 30–75 mole % of N-vinylpyrrolidone unit, 5–70 mole % of (meth)acrylamide unit and 0–20 mole % of (meth)acrylic acid unit or a salt thereof, (b) a water-soluble aldehyde, (c) a phenol compound, and (d) water. This composition can form a gel in a required gelling time even at high temperatures and even in the presence of bivalent metal ions and accordingly can be used for efficient recovery of petroleum and gas.

6 Claims, No Drawings

COMPOSITION AND METHOD FOR RECOVERY OF PETROLEUM AND GAS

BACKGROUND OF THE INVENTION

1. Field of the Invention

The present invention relates to a composition for recovery of petroleum and gas (hereinafter referred to as petroleum, etc.) present in oil reservoir or gas reservoir (hereinafter referred to as oil reservoir, etc.), as well as to a method for recovery of petroleum, etc. using the composition.

2. Description of the Related Art

For recovery of petroleum from underground oil reservoir, there has long been used generally a so-called primary recovery method which comprises finding an oil reservoir by exploration, constructing a drilling facility above the oil reservoir, and producing petroleum as long as the production is profitable.

In recent years, as the technique for exploration of oil reservoir advanced and the conditions of oil reservoir came to be known more precisely, there have been used secondary and tertiary recovery methods which comprise injecting a fluid into an underground oil reservoir, in which the production rate is already low as the result of primary recovery, to push the remaining petroleum to one side, thereby producing it for a higher recovery ratio. A typical example of the secondary recovery method is water flooding and there are, as the tertiary method, carbon dioxide flooding, steam flooding, micellar polymer flooding, etc.

Oil reservoirs differ in conditions, for example, permeability, oil viscosity, temperature, etc. Some oil reservoirs comprise a plurality of layers of different permeabilities. In such a case, with the above approach, the injected fluid mostly permeates the high-permeability portion of reservoir; as a result, the petroleum in reservoir is not replaced sufficiently; thus, efficient recovery of petroleum has been impossible.

Meanwhile, in the recovery of gas from an underground gas reservoir, the gas pressure in the vicinity of well decreases with the production of gas, causing a water-coning phenomenon; or the formation water which has permeated the high-permeability portion of the gas reservoir, is taken out together with gas, in some cases. This has resulted in low gas productivity and moreover has required a high cost for water disposal.

To prevent such low productivity of petroleum, etc., there has recently been used often a method which comprises injecting a polymer and a crosslinking agent into the high-permeability portion of an oil reservoir to form a polymer gel.

The above method includes, for example, a method using a gelling system of an acrylamide type polymer and a crosslinking metal ion to suppress the water permeability of the high-permeability portion of the oil reservoir (U.S. Pat. No. 3,762,476). In this method, an aqueous solution of an acrylamide type polymer and a crosslinking agent solution are alternately injected into the Oil reservoir to allow the two solutions to give rise to gelling in the oil reservoir; however, since the mixing of the aqueous polymer solution and the crosslinking agent solution in the oil reservoir is insufficient, no strong gel is formed.

To solve this problem, there was developed a method of injecting a polymer solution and a crosslinking agent simultaneously. There were proposed, for example, a gelling system using an acrylamide type polymer and chromium acetate (U.S. Pat. No. 4,683,949) and a gelling system using an acrylamide type polymer and a phenol type compound/ formaldehyde (U.S. Pat. No. 4,246,124).

The above approaches are effective for oil reservoirs, etc. having a temperature of about 70° C. or lower; however, when they are applied to oil reservoirs, etc. having a temperature higher than 70° C. and containing, particularly in the water present therein, bivalent metal ions (e.g. calcium ion and magnesium ion) in an amount of about 100 ppm or more, the formed polymer gel is destroyed or the gel causes syneresis, resulting in insufficient recovery.

In treating an underground oil reservoir, etc. of high permeability with a polymer gel, it is necessary to form a polymer gel of several cubic meters to several hundreds of cubic meters per well, in the oil reservoir, etc. and, in order to enable the formation of said gel, fluid(s) must be injected into the reservoir, etc. in several hours to ten-odd days, although these conditions differ depending upon the properties of the reservoir, etc. To prevent gelling during the injection, it is necessary to make the gelling time longer than the injection time; however, when the gelling time is longer than necessary, insufficient gelling takes place because the uncrosslinked gel permeates even the low-permeability portion of oil reservoir or because the gelling composition is diluted by the oil-reservoir water. Accordingly, in order to treat an oil reservoir, etc. of high permeability with a polymer gel to recover petroleum, etc. effectively, it is requisite to determine the amount, rate, etc. of gelling composition injected and select a gelling composition comprising a polymer and a crosslinking agent, having an appropriate gelling time.

SUMMARY OF THE INVENTION

The present invention aims at recovering petroleum and gas efficiently by using a gelling composition which can form a gel in a required gelling time even at high temperatures and even in the presence of bivalent metal ions.

The present inventors found out that the content of (meth)acrylic acid component in a copolymer plays an important role in the gelling time of gelling composition, and made a study also on the kinds and amounts of other components. As a result, the present invention has been completed and has solved the above-mentioned problems of the prior art.

The present invention lies in a composition for recovery of petroleum and gas, which comprises:

(a) a copolymer having a molecular weight of 100,000 or more, composed of 30–75 mole % of N-vinylpyrrolidone unit, 5–70 mole % of (meth)acrylamide unit and 0–20 mole % of (meth)acrylic acid unit or a salt thereof, (b) a water-soluble aldehyde, (c) a phenol compound, and (d) water.

The present invention also lies in a method for recovery of petroleum and gas, which comprises the steps of:

injecting the above composition into an oil reservoir or a gas reservoir, allowing the composition to cause gelling to plug the high-permeability portion of the reservoir, and recovering petroleum and gas from the reservoir.

The present invention also lies in a material composition used for preparation of the above composition.

DETAILED DESCRIPTION OF THE INVENTION

In the present invention, the copolymer, which is the component (a), is composed of 30–75 mole % of N-vinylpyrrolidone unit, 5–70 mole % of (meth)acrylamide unit and 0–20 mole % of (meth)acrylic acid unit or a salt thereof.

When the proportion of N-vinylpyrrolidone is less than 30 mole %, the resulting composition can cause gelling but gives rise to syneresis. When the proportion is more than 75 mole %, the resulting composition is incapable of causing gelling.

When the proportion of (meth)acrylamide is less than 5 mole %, the resulting composition is incapable of causing gelling. When the proportion is more than 70 mole %, the resulting composition can cause gelling but gives rise to syneresis.

The composition of the present invention can have a shorter or longer gelling time by increasing or decreasing the proportion of (meth)acrylic acid or salt thereof in a range of 0–20 mole % based on the copolymer. While the gelling time is influenced by the components of the copolymer and the amounts of the components of the composition, the gelling time can be shortened from about 10 days to about 3 days, for example, by increasing the proportion of (meth)acrylic acid or salt thereof from 0 mole % to 20 mole % when the proportion of N-vinylpyrrolidone is 50 mole %.

As the salt of (meth)acrylic acid, there is generally used sodium, potassium or ammonium salt.

In the present invention, the copolymer as the component (a) can be obtained from the above-mentioned monomers by a per se known process such as aqueous solution polymerization, reversed-phase emulsion polymerization, reversed-phase suspension polymerization or the like (U.S. Pat. No. 4,644,020 and U.S. Pat. No. 4,906,701).

The copolymer has a molecular weight of at least 100,000, preferably 100,000 to 5,000,000, more preferably 500,000 to 5,000,000. The upper limit of the molecular weight is not particularly restricted as long as the polymer is water-soluble and is injectable into oil reservoirs, etc. but is about 15,000,000.

The amount of the copolymer is not particularly restricted but is preferably 0.01–4.0% by weight, more preferably 0.02–2.0% by weight based on the composition of the present invention.

In the present invention, the water-soluble aldehyde, which is the component (b), is selected from aliphatic monoaldehydes and aliphatic dialdehydes. Preferable examples are formaldehyde, paraformaldehyde, acetaldehyde, propionaldehyde, glyoxal and glutaraldehyde. Among these, formaldehyde is particularly preferable. These water-soluble aldehydes can be used singly or in admixture of two or more.

The amount of the water-soluble aldehyde is not particularly restricted but is preferably 0.01–1.2% by weight, more preferably 0.02–1.0% by weight based on the composition of the present invention.

In the present invention, the phenol compound, which is the component (c), is selected from the group consisting of monohydroxyphenol, polyhydroxyphenols, monohydroxynaphthol and polyhydroxynaphthols. Preferable examples are phenol, o-cresol, m-cresol, p-cresol, resorcinol, catechol, hydroquinone, pyrogallol, o-aminophenol, m-aminophenol and p-aminophenol. Among these, particularly preferable are phenol, resorcinol, catechol and hydroquinone. These phenol compounds can be used singly or in admixture of two or more.

The amount of the phenol compound is not particularly restricted but is preferably 0.01–2.0% by weight, more preferably 0.02–1.5% by weight based on the composition of the present invention.

The molar ratio of the water-soluble aldehyde and the phenol compound is not particularly restricted but is preferably 0.5:1 to 25:1, more preferably 1:1 to 4:1.

The composition of the present invention can be obtained by dissolving or dispersing the components (a), (b) and (c) in water so that the resulting composition has an intended gelling time. The present composition is preferably obtained by dissolving or dispersing, a material composition for preparation of the present composition, comprising 0.01–4.0 parts by weight of the above-mentioned component (a), 0.01–1.2 parts by weight of the above-mentioned component (b) and 0.01–2.0 parts by weight of the above-mentioned component (c), in such an appropriate amount of water that the amount of the resulting solution or dispersion becomes 100 parts by weight.

In the present invention, water, which is the component (d), is preferably an oil-reservoir water, fresh water, sea water, a water whose salt concentration is controlled artificially, etc.

The injection of the present composition into an oil reservoir, etc. can be conducted by the use of a method generally employed in the related field (reference is made to, for example, U.S. Pat. Nos. 4,799,548, 4,799,550, 4,926,943 and 4,964,463).

The composition of the present invention functions effectively even in oil reservoirs, etc. having high temperatures of about 70° C. to about 150° C. and containing bivalent metal ions in an amount of about 100 ppm or more. Moreover, the present composition can have a gelling time suitable for the conditions of oil reservoir, etc. to which the composition is applied, by appropriately selecting the amount of (meth)acrylic acid or salt thereof in the composition. Consequently, the present composition enables efficient recovery of petroleum, etc.

The present invention is hereinafter described specifically by way of Examples. However, the present invention is not restricted to these Examples.

EXAMPLE 1

(1) Production of copolymers 18.1 g of N-vinylpyrrolidone, 10.4 g of acrylamide and 1.5 g of sodium acrylate (the molar ratio=50:45:5) were dissolved in deionized water to obtain 500 g of a solution. Thereto was added 0.10 g of an azo type compound (V-50, a product of Wako Pure Chemical Industries, Ltd.) as a polymerization initiator. The gas phase of the system was replaced by nitrogen, and polymerization was conducted at 40° C. for 8 hours.

The resulting copolymer was dried at 60° C. for 16 hours in a hot air drier to obtain a dried copolymer B. The copolymer B had an intrinsic viscosity of 5.5 dl/g (molecular weight=2,070,000) at 30° C. in 1N $NaNO_3$.

Copolymers A, C and D having the compositions shown in Table 1 were produced in the same manner as above.

TABLE 1

| | Copolymer composition (mole %) | | | Intrinsic vis. (dl/g) |
|---|---|---|---|---|
| | N-vinyl-pyrrolidone | Acrylamide | Sodium acrylate | |
| A | 50 | 50 | 0 | 5.2 |
| B | 50 | 45 | 5 | 5.5 |
| C | 50 | 40 | 10 | 5.7 |
| D | 50 | 30 | 20 | 5.8 |

(2) Test for Gelling 100 ml of artificial sea water was placed in a 200-ml beaker. Thereto was added the copolymer A, B, C or D in such an amount as to give the following concentration, and the copolymer was dissolved in the sea water by stirring. Thereto were added a 5% aqueous phenol solution and a 10% formalin solution in this order, to prepare four kinds of solutions each to be used for a test for gelling.

| Copolymer A, B, C or D | 1.0 wt. % |
|---|---|
| Phenol | 0.1 wt. % |
| Formaldehyde | 0.1 wt. % |

Then, 40 ml of each solution was placed in a vial having an inside diameter of 30 mm and a height of 100 mm. The vial was heat-sealed in a nitrogen atmosphere and kept at 100° C. in a hot air drier.

(3) Measurement of gelling time and examination of syneresis

Gelling time was measured by periodically taking out the vial kept at the above temperature in the drier and visually inspecting the formation of gel. Syneresis was examined by keeping the gel-formed sample at the same temperature and visually inspecting the occurrence of syneresis.

(4) Results

The results of the above (3) are shown in Table 2.

TABLE 2

| | Copolymers used | | | |
|---|---|---|---|---|
| | A | B | C | D |
| Gelling time (hr) | 235 | 168 | 92 | 72 |
| Syneresis | No syneresis in 50 days | 168 | 92 | 72 |

When the molar ratio of acrylamide and sodium acrylate in copolymer was varied with the N-vinylpyrrolidone content in copolymer kept constant (50 mole %), the gelling time was shorter as the proportion of the sodium acrylate increased. No syneresis was seen in any copolymer.

EXAMPLE 2

The procedure of Example 1 was repeated except that the amounts of phenol and formaldehyde were varied. The results shown in Table 3 were obtained.

TABLE 3

| | Copolymer | | | |
|---|---|---|---|---|
| | A | B | C | D |
| Phenol (wt. %) | 0.05 | 0.05 | 0.05 | 0.05 |
| Formaldehyde (wt. %) | 0.08 | 0.08 | 0.08 | 0.08 |
| Gelling time (hr) | 273 | 190 | 102 | 85 |
| Syneresis | No syneresis in 50 days | 190 | 102 | 85 |

EXAMPLE 3

Copolymers E, F, G and H shown in Table 4 were produced in the same manner as in the item (1) of Example 1. Solutions for test for gelling, shown in Table 4, were prepared in the same manner as in Example 1 and used for measurement of gelling time and examination of syneresis. Each vial was kept in the hot air drier at 80° C. The results are shown in Table 4.

TABLE 4

| | Copolymer (mole %) | | | |
|---|---|---|---|---|
| | E | F | G | H |
| N-vinyl-pyrrolidone | 25 | 30 | 30 | 30 |
| Acrylamide | 75 | 70 | 65 | 55 |
| Sodium acrylate | 0 | 0 | 5 | 15 |
| Copolymer conc. (wt. %) | 0.8 | 0.8 | 0.8 | 0.8 |
| Phenol (wt. %) | 0.15 | 0.15 | 0.15 | 0.15 |
| Formaldehyde (wt. %) | 0.12 | 0.12 | 0.12 | 0.12 |
| Gelling time (hr) | 165 | 280 | 190 | 153 |
| Syneresis | Syneresis in 35 days | No syneresis in 50 days | 190 | 153 |

The copolymer E containing 25 mole % of N-vinylpyrrolidone caused gelling but invited syneresis in 35 days.

EXAMPLE 4

Copolymers I, J and K shown in Table 5 were produced in the same manner as in the item (1) of Example 1. Solutions for test for gelling, shown in Table 5, were prepared in the same manner as in Example 1 and used for measurement of gelling time and examination of syneresis. Each vial was kept in the hot air drier at 110° C. The results are shown in Table 5.

TABLE 5

| | Copolymer (mole %) | | |
|---|---|---|---|
| | I | J | K |
| N-vinylpyrrolidone | 60 | 60 | 60 |
| Acrylamide | 40 | 35 | 30 |
| Sodium acrylate | 0 | 5 | 10 |
| Copolymer conc. (wt. %) | 1.2 | 1.2 | 1.2 |
| Phenol (wt. %) | 0.13 | 0.13 | 0.13 |
| Formaldehyde (wt. %) | 0.08 | 0.08 | 0.08 |
| Gelling time (hr) | 256 | 144 | 107 |
| Syneresis | No syneresis in 50 days | 144 | 107 |

When the molar ratio of acrylamide and sodium acrylate in copolymer was varied with the N-vinylpyrrolidone content in copolymer kept constant (60 mole %), the gelling time was shorter as the proportion of the sodium acrylate increased. No syneresis was seen in any copolymer.

What is claimed is:

1. A composition for recovery of petroleum and gas, which comprises:
   (a) a copolymer having a molecular weight of 100,000 or more, consisting of 30–75 mole % of N-vinylpyrrolidone unit, 5–65 mole % of (meth)acrylamide unit and 5–20 mole % of (meth)acrylic acid unit or a salt thereof,
   (b) a water-soluble aldehyde,
   (c) a phenol compound, and
   (d) water.

2. A composition according to claim 1, wherein the amount of the copolymer is 0.01–4.0% by weight, the amount of the water-soluble aldehyde is 0.01–1.2% by weight and the amount of the phenol compound is 0.01–2.0% by weight, all based on the weight of the composition, and the remainder is water.

3. A composition according to claim 2, wherein the water-soluble aldehyde is formaldehyde.

4. A composition according to claim 2, wherein the phenol compound is at least one compound selected from the group consisting of phenol, resorcinol, catechol and hydroquinone.

5. A method for recovery of petroleum and gas, which comprises the steps of:

injecting the composition of claim 1 into an oil reservoir or a gas reservoir, allowing the composition to cause gelling to plug the high-permeability portion of the reservoir, and recovering petroleum and gas from the reservoir.

6. A material composition suitable for preparation of the composition of claim 1, which comprises:
   (a) a copolymer having a molecular weight of 100,000 or more, consisting of 30–75 mole % of N-vinylpyrrolidone unit, 5–65 mole % of (meth)acrylamide unit and 5–20 mole % of (meth)acrylic acid unit or a salt thereof,
   (b) a water-soluble aldehyde, and
   (c) a phenol compound.

* * * * *